J. P. HYLAN.
CORN KNIFE.
APPLICATION FILED FEB. 12, 1913.
1,091,576.
Patented Mar. 31, 1914.
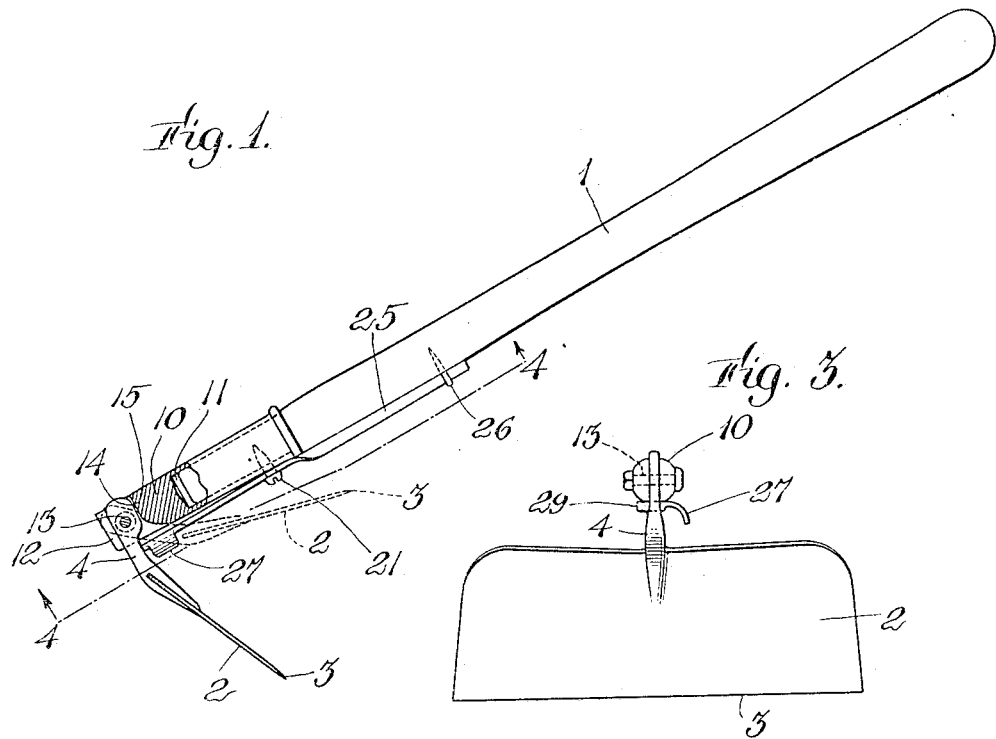
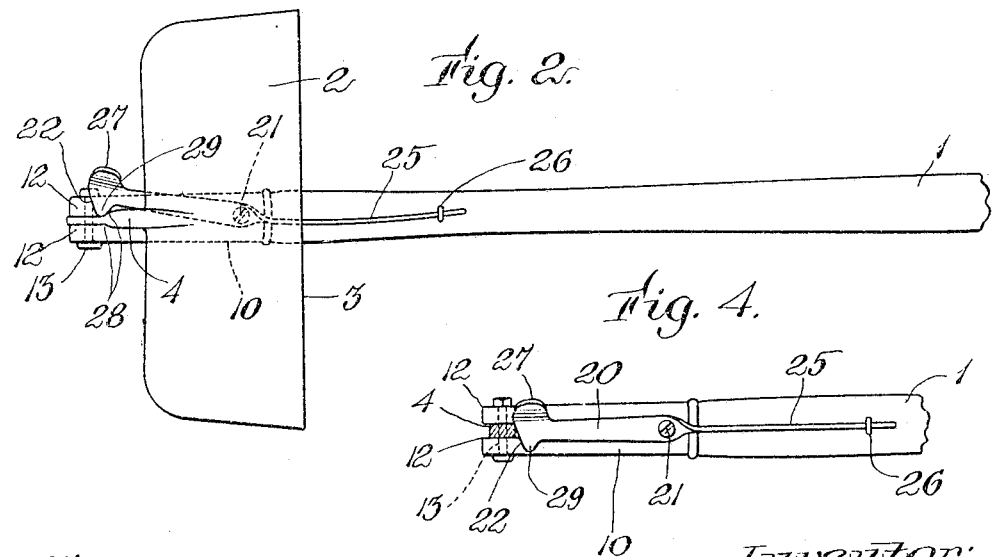
Witnesses:
George E. Stebbins
Alice Ackroyd
Inventor:
John P. Hylan
by his Attorneys
Philipp Van Overen & Fish

UNITED STATES PATENT OFFICE.

JOHN P. HYLAN, OF STONEHAM, MASSACHUSETTS.

CORN-KNIFE.

1,091,576.

Specification of Letters Patent. Patented Mar. 31, 1914.

Application filed February 12, 1913. Serial No. 747,833.

*To all whom it may concern:*

Be it known that I, JOHN P. HYLAN, a citizen of the United States, residing at Stoneham, in the county of Middlesex and State of Massachusetts, have invented certain new and useful Improvements in Corn-Knives; and I do hereby declare the following to be a full, clear, and exact description of the invention, such as will enable others skilled in the art to which it appertains to make and use the same.

The present invention relates to corn knives, and more particularly to a knife for harvesting cornstalks in the field.

One object of the present invention is to provide a corn knife with which the cutting stroke is easily and effectively delivered to the cornstalks while the harvester is holding the upper part of the stalks with his arm.

Another object of the present invention is to connect the cutting blade with the handle so that the blade may be folded against the handle when the knife is not in use to protect the cutting edge and prevent accidents.

With the above objects in view, the present invention consists in the corn cutting knife hereinafter described and particularly pointed out in the claims.

In the drawings which illustrate the preferred embodiment of the present invention, Figure 1 is a side view, taken partly in section, of the corn knife with the blade extended, the position of the blade when folded being indicated in dotted lines; Fig. 2 is another view of the corn knife with the blade folded; Fig. 3 is an end view of the corn knife with the blade extended; and Fig. 4 is a detail view illustrating particularly the holding latch.

Referring to the drawings, the corn cutting knife has a straight wooden handle 1 and a cutting blade 2 carried upon the end of the handle. The blade 2 extends laterally away from the handle in a direction slightly inclined to a plane normal to the axis of the handle and terminates in a straight sharp cutting edge 3 which is directed away from the handle. This straight edge 3 lies in a line which extends at right angles to the axis of the handle 1 but which lies at one side of the handle and does not intersect it. The blade 2 is carried by an arm 4 formed integral therewith and extending back at substantially right angles to the cutting edge of the blade. The arm 4 is connected to the handle 1 by means of an elbow joint so that the blade can be extended into the position indicated in full lines in Fig. 1 when the knife is to be used, and can be folded back against the handle into the position shown in dotted lines in Fig. 1 when the knife is not in use. In order to form a strong elbow joint, the handle 1 is provided with a strong metal tip 10 which has a socket 11 in which the reduced end of the handle 1 is received. The end of the tip 10 is slotted to form two ears 12 between which the blade supporting arm 4 is received. A pin 13 is riveted in the ears 12 and extends across the slot between them to form a pivot pin for the arm 4. The end of the arm 4 is continued beyond the pin 13 to form a heel 14 which engages a stop shoulder 15 at the bottom of the slot, so as to limit the movement of the arm 4 when it is turned out from the handle and hold it extended. A latch 20 coöperates with the heel 14 and shoulder 15 of the elbow joint to hold the blade 2 rigidly extended when in use and permits the blade to be folded back against the handle when not in use. The latch 20 is formed by a metal bar extending along the handle and parallel to it and mounted upon a pivot screw 21. The pivot screw 21 passes through the tip 10 and preferably enters the part of the wooden handle which is in the socket 11, and thus serves as a retaining pin to hold the tip 10 in place upon the wooden handle. The free end of the latch 20 has formed upon it an inclined surface 22 which, as shown in Figs. 1 and 4, is arranged to engage the arm 4 and hold it extended. The surface 22 is slightly inclined so that when the parts become somewhat worn, the latch can move farther across behind the arm 4 and still hold the heel 14 rigidly against its top shoulder 15, and thus compensate for wear. The other end of the latch piece 20 terminates in a leaf spring 25 which is loosely received in a staple 26. The spring 25 tends to move the end of the latch into position behind the arm 4 and keep the arm extended.

The latch 20 has a handle 27 which can be grasped with the thumb or finger to pull the latch to one side of the arm 4 to permit the arm to be folded against the handle, as indicated in Fig. 2. The end of the arm 4 which is received between the ears 12 is narrowed so that inclined shoulders 28 are formed between it and the thicker portion of the arm next the blade. The end of the latch 20 has a nose 29 which, when the blade is folded against the handle, engages one of the shoulders 28 and holds the blade in its folded position. When the blade is folded against the handle, the sharp cutting edge is in a position in which it is not likely to become accidentally dulled or to be dangerous.

In using the knife, the harvester grasps a hill of cornstalks under his arm, and then cuts them near the ground with a slashing stroke of the corn knife. The blade 2 is inclined to the handle at a slight angle so that it is about tangent to the curved path of movement of the blade when the harvester delivers the cutting stroke, and the cutting stroke is delivered in the most efficient manner. When the blow is delivered, the handle 1 can be held in a direction generally parallel with the cornstalks so that the amount of stooping on the part of the harvester is reduced to the minimum.

While the preferred embodiment of the present invention has been specifically illustrated and described, the present invention is not limited to the illustrated embodiment but may be embodied in other constructions within the purview of the invention as set forth in the following claims:—

1. A corn knife having, in combination, a handle, a blade having a substantially straight sharp cutting edge directed away from the handle, a supporting arm for the blade, an elbow joint formed between the handle and the arm having stops for limiting the movement of the arm when extended from the handle, a latch pivoted to the handle and arranged to engage behind the arm when it is extended and hold the arm rigidly against the stops of the elbow joint, a nose on the latch for engaging the arm when the blade is folded against the handle to hold it in its folded position, and a spring connected with the latch for holding the latch in engagement behind the arm when the blade is extended and for holding the nose in engagement with the arm when the blade is folded.

2. A corn knife having, in combination, a handle having a slotted end, a pivot pin extending across the slot, a blade having a substantially straight sharp cutting edge, a blade-carrying arm extending back substantially at right angles to the cutting edge and mounted upon the pivot pin at its end to form an elbow joint with the handle, said slot being provided with a stop shoulder at its bottom on the opposite side of the pivot from the blade, a heel upon the arm for engaging the stop shoulder on the handle to limit the movement of the arm when it is extended from the handle, and a spring latch pivoted to the handle to move in a plane at right angles to the plane of movement of the blade, having its end adapted to engage the blade-carrying arm on the opposite side of the pivot from the heel so that the blade when in extended position is held rigidly in such position by the engagement of the heel of the blade-carrying arm with the shoulder on the one side of the pivot and by the engagement of the latch with the arm on the other side of the pivot, substantially as described.

JOHN P. HYLAN.

Witnesses:
 HORACE VAN EVEREN,
 GEORGE E. STEBBINS.